April 13, 1965

K. HILDEBRAND 3,177,769

AFOCAL FRONT LENS SYSTEM FOR SHORTENING
THE FOCAL LENGTH OF OBJECTIVES
Filed May 16, 1960

INVENTOR
Klaus Hildebrand

By: Samuel W. Kipnis
Atty.

United States Patent Office 3,177,769
Patented Apr. 13, 1965

3,177,769
AFOCAL FRONT LENS SYSTEM FOR SHORTENING THE FOCAL LENGTH OF OBJECTIVES
Klaus Hildebrand, Berlin-Neukoelln, Germany, assignor to Continental Elektroindustrie A.G., Askania-Werke, Berlin-Mariendorf, Germany, a corporation of Germany
Filed May 16, 1960, Ser. No. 29,332
Claims priority, application Germany, May 30, 1959, A 32,134
6 Claims. (Cl. 88—57)

This invention relates to an afocal front cell or lens system for shortening the focal length of camera objectives and the like, in other words for enlarging the angle of view of such an objective. It is basically known to achieve such enlargement by the use of spaced components of negative and positive power, the enlargement being often between .6 and .8 and being defined by $-F_I/F_{II}$, wherein $F_I$ is the focal length of the negative system and $F_{II}$ is that of the positive system.

It is known that the correction of systems of this kind is increasingly difficult as the image angle and the size of the objective image are increased. This has been so in spite of the use of very different principles of construction. For instance the system of German Patent 831,156 is one of those which are still subject to appreciable astigmatic aberration and due to its construction it is unsuitable for reducing the focal length of cameras of relatively large image format.

The object of the invention was to overcome such limitations. This was found to be possible and the invention provides a system of the generally indicated type which new system is characterized not only by relatively short length but also by almost perfect correction of astigmatism and image field curvature. The new system also limits distortion so as to make it acceptable for the definite majority of practical applications.

For this purpose the system according to the invention utilizes a novel combination of components of negative and positive power, one spaced from the other, which combination is characterized particularly by the new component of positive power, this component consisting of three lenses, preferably cemented together and at any rate not appreciably spaced, the front and rear lenses of the component having positive refracting power and the middle or second lens having negative power, said second lens having a refractive index in excess of 1.68 and an Abbe number or reciprocal of dispersive power in excess of 40, said index and number being related to the green or E line of mercury. The rear lens has a refractive index of less than 1.54. The front surface of the farthest lens has a radius of .2 to .6 times the focal length of the positive component, the thickness of said farthest lens being in excess of .25 times said focal length.

Figure 1:
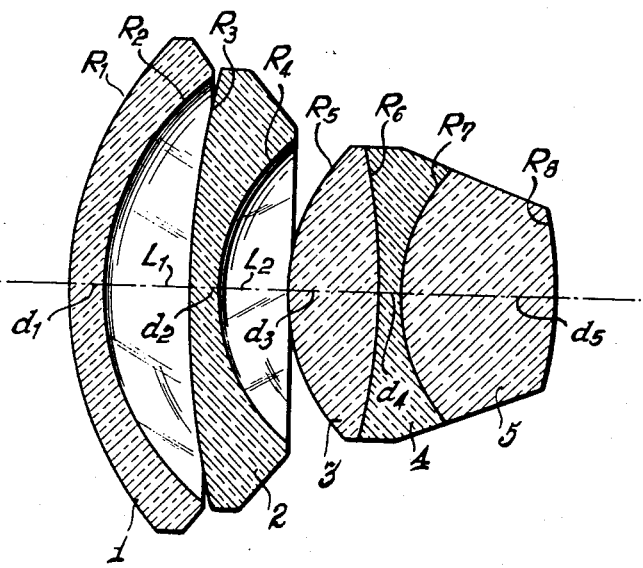
Figure 2:
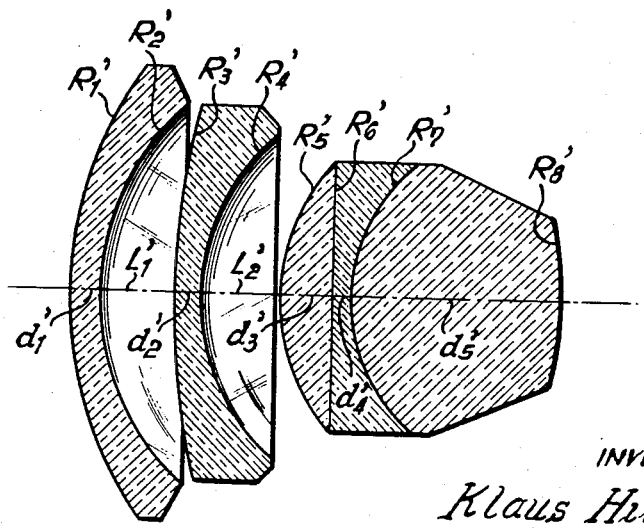

Two wide angle systems according to the invention are shown in the drawing. FIGURE 1 is a longitudinal section through such a system, wherein the Abbe numbers of the front and rear lenses of the positive component differ relatively little. FIGURE 2 is a generally similar section of an embodiment wherein these numbers differ more.

It is important to note that neither the negative component shown in FIGURE 1 by lenses 1, 2, nor the positive component, here shown by lenses 3, 4, 5, by itself corrects the imaging error known as Seidel's error. The same statement applies to the chromatic aberration. Correction of the system is accordingly achieved by mutual compensation of the errors of the two components. In further accordance with the invention, compliance with the Petzval condition has been achieved by introducing into component 3, 4, 5 a lens 4 of highly refractive glass and great negative power of refraction, which has at the same time achieved correction of chromatic aberration by the use of small dispersion in said lens 4, particularly by means of a lanthanum crown glass for the same.

The negative component 1, 2 of the front cell system according to the invention comprises two individual lenses 1 and 2, lens 1 having refractive power less than .4 times and greater than .1 times that of the entire negative component 1, 2 and lens 2 having refractive power less than .9 times and greater than .6 times that of said component. Both lenses 1 and 2 are preferably menisci concave toward the positive component 3, 4, 5. The glasses of lenses 1 and 2 have Abbe numbers in excess of 55. If greater distortion can be tolerated, the negative component may also consist of a single lens, the characteristics of which will be clear to persons skilled in the art from the information given herein.

In the positive component 3, 4, 5 according to the invention, the first lens 3 has refractive power greater than 1.2 times and less than 2.0 times that of the entire positive component, while lens 4 has refractive power between 1.8 and 3.1 times that of said component and lens 5 has such power between 1.2 and 2 times that of said component.

The aperture error necessarily introduced by the peculiar formation of the fourth and fifth surfaces $R_4$, $R_5$ of the described system, which have radii differing by less than .1 times the focal length of the positive component, is substantially compensated at the seventh surface $R_7$, as is the coma, in the Seidel region. The substantial astigmatic aberrations of said fourth and fifth surfaces cancel out in substance, while said seventh surface reintroduces considerable astigmatism; that, however, is compensated at the eighth surface $R_8$.

So long as the principle of construction, outlined above, is maintained, it is also possible to replace the cement areas $R_6$, $R_7$ of the positive component by air spaces. Furthermore any or all of the elements 3, 4, 5 of this component can be divided into doublets or the like, so long as the above-stated conditions relating to the glass of said lenses are complied with.

Specific dimensions (in millimeters) and values can be listed as follows, for one embodiment according to FIGURE 1:

| Radius | Distance | Refractive Index | Abbe Number |
|---|---|---|---|
| $R_1 = +45.81$ | $d_1 = 4.0$ | 1.5201 | 65.0 |
| $R_2 = +32.57$ | $l_1 = 10.5$ | | |
| $R_3 = +149.88$ | $d_2 = 4.0$ | 1.5421 | 59.4 |
| $R_4 = +25.20$ | $l_2 = 8.6$ | | |
| $R_5 = +26.0$ | $d_3 = 11.8$ | 1.5919 | 48.4 |
| $R_6 = -94.42$ | $d_4 = 2.8$ | 1.7922 | 50.2 |
| $R_7 = +23.16$ | $d_5 = 19.3$ | 1.5021 | 61.3 |
| $R_8 = -56.03$ | | | | and as follows for one embodiment according to FIGURE 2, wherein corresponding dimensions are designated similarly to FIGURE 1, but with the addition of the "'" (prime) symbol:

| Radius | Distance | Refractive Index | Abbe Number |
|---|---|---|---|
| $R_1'=+54.85$ | | | |
| $R_2'=+35.37$ | $d_1'=4.0$ | 1.5187 | 64.0 |
| $R_3'=+121.49$ | $l_1'=10.5$ | | |
| $R_4'=+30.31$ | $d_2'=4.5$ | 1.5590 | 58.3 |
| $R_5'=+28.31$ | $l_2'=11.1$ | | |
| $R_6'=\infty$ | $d_3'=8.0$ | 1.5926 | 40.7 |
| $R_7'=+23.79$ | $d_4'=2.5$ | 1.7922 | 50.2 |
| $R_8'=-80.15$ | $d_5'=30.1$ | 1.4892 | 69.9 |

The refractive indices and Abbe numbers shown in these charts relate to the green or E line of mercury.

I claim:
1. An afocal, anastigmatic front cell lens system for shortening the focal length of objectives, comprising a component of negative refractive power concave to one side; and a component of positive refractive power disposed on said side and consisting of three lens means not appreciably spaced from one another, the lens means closest to and farthest from the component of negative power having positive refractive powers; and the lens means between said closest and farthest lens means having negative refractive power and having a refractive index in excess of 1.68 related to the green mercury line of the spectrum, and having an Abbe number in excess of 40 related to said line; said closest lens means having positive refractive power between 1.2 times and 2.0 times that of the entire component of positive power; the lens means between the closest and farthest having negative refractive power between 1.8 times and 3.1 times that of said entire component; and lens means farthest from the negative component having positive refractive power between 1.2 times and 2.0 times that of the entire positive component; said component of negative power comprising two menisci spaced from one another, the first of which having negative refractive power between .4 and .1 times, and the second of which having negative refractive power between .9 and .6 times, the refractive power of the entire negative component.

2. A system as described in claim 1 wherein the radii of mutually adjacent surfaces of the negative and positive components differ by less than .1 times the focal length of the positive component.

3. A system as described in claim 1 wherein the said farthest lens has a refractive index of less than 1.54.

4. A system as described in claim 1 wherein the front surface of said farthest lens has a radius of .2 to .6 times the focal length of the positive component, the thickness of said farthest lens being in excess of .25 times said focal length.

5. A system as described in claim 1 wherein the negative component has surface radii $R_1$ to $R_4$ and thickness and spacing dimensions $d_1$, $l_1$ and $d_2$ and the positive component has dimensions $R_5$ to $R_8$ and $d_3$ to $d_5$, in millimeters with refractive indices and Abbe numbers, related to the green mercury line, as follows:

| Radius | $d$ or $l$ | Refractive Index | Abbe Number |
|---|---|---|---|
| $R_1=+45.81$ | | | |
| $R_2=+32.57$ | $d_1=4.0$ | 1.5201 | 65.0 |
| $R_3=+149.99$ | $l_1=10.5$ | | |
| $R_4=+25.20$ | $d_2=4.0$ | 1.5421 | 59.4 |
| $R_5=+26.0$ | $l_2=8.6$ | | |
| $R_6=-94.42$ | $d_3=11.8$ | 1.5919 | 48.4 |
| $R_7=+23.16$ | $d_4=2.8$ | 1.7922 | 50.2 |
| $R_8=-56.03$ | $d_5=19.3$ | 1.5021 | 61.3 | where the first two radii are those of respective surfaces of lens 1, the second two radii are the radii of the surfaces of lens 2, said lenses 1 and 2 being said respective menisci, and where the last four radii are the successive radii of the surfaces of lenses 3, 4 and 5, the interfaces between said lenses 3, 4 and 5 each being of common radius.

6. A system as described in claim 1 wherein the negative component has surface radii $R_1'$ to $R_4'$ and thickness and spacing dimensions $d_1'$, $l_1'$ and $d_2'$ and the positive component has dimensions $R_5'$ to $R_8'$ and $d_3'$ to $d_5'$, in millimeters, with refractive indices and Abbe numbers, related to the green mercury line, as follows:

| Radius | $d'$ or $l'$ | Refractive Index | Abbe Number |
|---|---|---|---|
| $R_1'=+54.85$ | | | |
| $R_2'=+35.37$ | $d_1'=4.0$ | 1.5187 | 64.0 |
| $R_3'=+121.49$ | $l_1'=10.5$ | | |
| $R_4'=+30.31$ | $d_2'=4.5$ | 1.5590 | 58.3 |
| $R_5'=+28.31$ | $l_2'=11.1$ | | |
| $R_6'=\infty$ | $d_3'=8.0$ | 1.5926 | 40.7 |
| $R_7'=+23.79$ | $d_4'=2.5$ | 1.7922 | 50.2 |
| $R_8'=-80.15$ | $d_5'=30.1$ | 1.4892 | 69.9 | where the first two radii are those of respective surfaces of lens 1, the second two radii are the radii of the surfaces of lens 2, said lenses 1 and 2 being said respective menisci, and where the last four radii are the successive radii of the surfaces of lenses 3, 4 and 5, the interfaces between said lenses 3, 4, and 5 each being of common radius.

References Cited by the Examiner
UNITED STATES PATENTS

| 1,122,895 | 12/14 | Florian | 88—57 |
| 2,140,024 | 12/38 | Merte | 88—57 |
| 2,734,424 | 2/56 | Bertele | 88—57 |
| 2,822,727 | 2/58 | Raitiere | 88—57 |
| 2,854,891 | 10/58 | Shade | 88—57 |

JEWELL H. PEDERSEN, *Primary Examiner.*

EMIL G. ANDERSON, FREDERICK M. STRADER,
*Examiners.*